Figure 2:
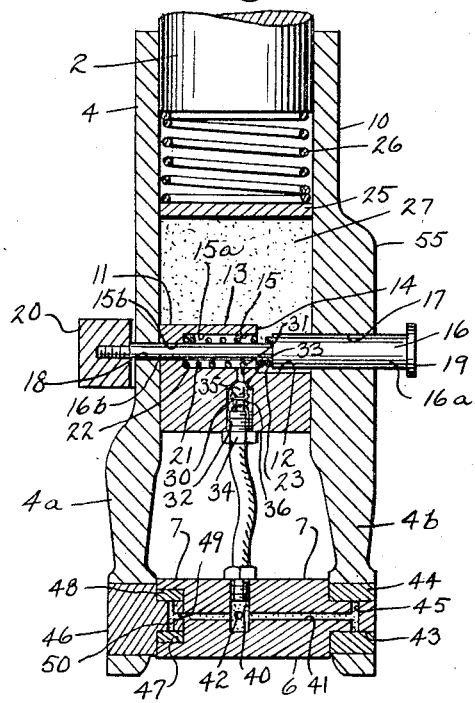

June 20, 1967  G. F. DELKER  3,326,323
UNIVERSAL JOINT WITH AN AUTOMATIC GREASING MECHANISM
Filed April 15, 1965

INVENTOR
GLENN F. DELKER

BY

ATTORNEY

United States Patent Office 3,326,323
Patented June 20, 1967

3,326,323
UNIVERSAL JOINT WITH AN AUTOMATIC
GREASING MECHANISM
Glenn F. Delker, 8427 W. Hawthorne Ave.,
Wauwatosa, Wis. 53213
Filed Apr. 15, 1965, Ser. No. 448,413
5 Claims. (Cl. 184—6)

This invention relates generally to a mechanism for automatically providing lubricating grease to the bearing surfaces in a rotating mechanism; more particularly, the present invention relates to a rotatable universal joint including automatic means for supplying grease to a rotatable member of the universal joint wherein the grease fitting which would normally be connected to a supply of grease rotates with the surfaces which are to be greased.

The term "grease" or "lubricating grease" as used herein and in the claims is defined as a solid to semi-fluid product comprising a dispersion of a thickening agent in a liquid lubricant; other ingredients for imparting particular properties may also be included in the grease. Grease as used herein is a lubricant which has been thickened so that it will remain in contact with the moving surfaces which it is to lubricate and will not leak out under gravity or centrifugal action. Grease as thusly defined is normally supplied by one of two systems: manual systems in which the surface to be greased is fitted with a suitable grease fitting and grease is supplied thereto by manually connecting a grease gun to the fitting and pumping grease into the area, and centralized grease systems which incorporate a grease supply, a pump and lines leading to suitable grease fittings wherein the unit is applied to a machine or vehicle and the operator can grease all the connected fittings upon activating the pump. It is to a greasing system of the latter type to which the present invention is most closely related.

Centralized greasing systems as defined above, whether automatically or manually actuated, enjoy wide use because of their convenience in insuring proper lubrication of many grease points at suitable intervals. The systems presently known are entirely satisfactory for use in greasing any point wherein the grease fitting for receiving the grease supplied to that point is stationary, However, in the case of a surface which must be lubricated but is of such a character that the grease fitting which supplies it rotates with the surface to be greased, the presently-known centralized grease systems cannot be utilized. A rotating universal joint is of this character because the grease fitting which must be attached to a supply of grease is carried on a member that rotates with the universal joint itself and there is no commercially feasible way to connect a grease feed-line to a movable grease fitting in a universal joint. A principle object of this invention is to provide an automatic grease or lubricating mechanism which will supply grease under pressure to a moving grease fitting; more particularly, a main object of this invention is to provide an automatic greasing mechanism for supplying grease to a rotatable universal joint such as is commonly used in connecting two rotating shafts.

The present invention can find application in various types of universal joints such as are generally found in machinery or vehicles. A typical universal joint of the type under consideration for connecting two shafts may consist of a yoke on the end of each shaft and a spyder member connecting the fingers of the two yokes together so that rotation of one shaft will be transmitted to the other shaft. The present method of lubricating universal joints of this type is to supply grease with a grease gun through a grease fitting located in the spyder of the joint. The spyder is cross drilled with fluid flow passages to allow the lubricant to pass from the fitting to the locations to be lubricated. Lubrication should be accomplished at time or operating intervals as specified by the manufacturer of the equipment in which the universal joint is included and in the case of farm machinery, for example, universal joints may have to be greased once or twice a day and in the case of trucks, as another example, every 1000 to 2000 miles. There is not as yet a satisfactory "sealed for life" bearing for use with universal joints and hence there is a need for providing an automatic system for lubricating these universal joints.

A more specific object of this invention is to provide a rotating universal joint wtih an automatic grease mechanism wherein the various elements of the greasing mechanism rotate with the joint which is to be lubricated. A still more specific object of this invention is to provide a greasing mechanism of the foregoing type wherein much of the weight of the mechanism and the stored grease to be supplied by the mechanism is in the center of the drive line so that it will not materially or adversely contribute to imbalance of the universal joint.

Briefly stated, the objects of this invention are accomplished through the provision, in a yoke of a universal joint, of a plunger supported in a member fixed in the yoke wherein the plunger is adapted to move under centrifugal force when the yoke rotates and thereby pump a selected quantity of grease under pressure to the bearing surfaces in the universal joint which require lubrication. The mechanism delivers the grease whenever the universal commences its rotation and the grease is delivered as a measured quantum of grease rather than as a continuous flow.

The foregoing and other more specific objects will appear in the description which follows. In the description reference is made to the accompanying drawings which form a part hereof and in which a specific form of this invention is shown. The embodiment described is for the purpose of illustration and not of limitation and it is set forth in detail to enable those skilled in the art to practice the present invention. Although some changes are suggested in the following description, it is to be understood that other changes may be devised and that other embodiments of the invention may be made by those skilled in the art without departing from the true scope of the present invention. Unless otherwise stated, limitations set-forth in the following detailed description should be interpreted as being illustrative only.

Figure 1:
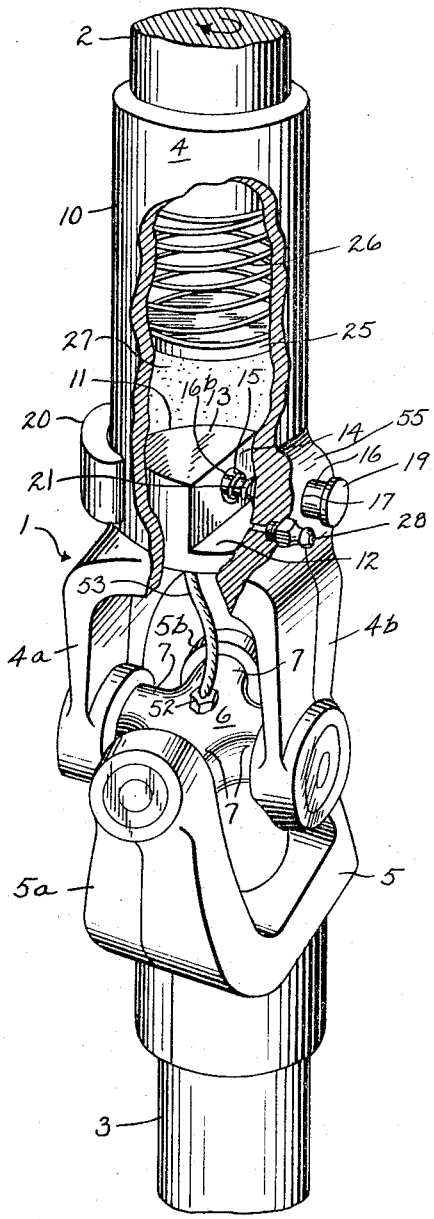
Figure 3:
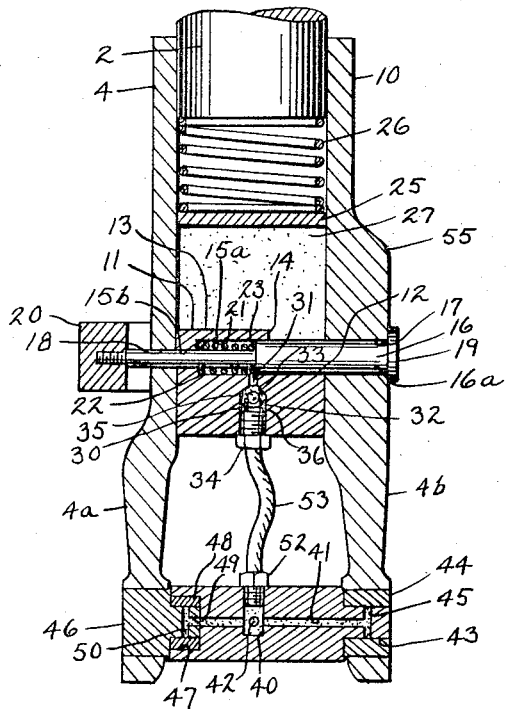

In the drawings:

FIG. 1 is a perspective view, with portions broken away, of a universal joint including an automatic grease mechanism according to the present invention;

FIG. 2 is a sectional view of a portion of the universal joint of FIG. 1 illustrating the present mechanism in an at-rest condition wherein it is not supplying grease to the fitting to be lubricated; and FIG. 3 is a cross sectional view similar to FIG. 2 illustrating the mechanism of this invention during rotation and wherein it has completed delivery of a supply of grease to the selected grease fitting.

FIG. 1 illustrates a universal joint indicated generally by the numeral 1 which is used to connect a first rotatable shaft 2 to a second rotatable shaft 3. The universal joint 1 includes a yoke 4 attached to shaft 2 and a similar yoke 5 attached to shaft 3, with each yoke having projecting fingers 4a, 4b and 5a, 5b respectively. A spyder 6 interconnects the fingers of each yoke so that power can be transmitted from one yoke to the other. The spyder 6 in the form depicted in the drawings is generally cruciform in shape and has four radial arms 7, the ends of which are received in suitably-formed cavities in the end of each yoke finger. There is a bearing surface between each arm of the spyder and each cavity in the yoke fingers which must be greased in order to preserve the operating life of the universal joint, and the present invention is designed to provide an automatic system for supplying grease under pressure to such bearing surfaces. At least one of the shafts 2 and 3 may be connected to any suitable power source. The universal joint as illustrated in FIG. 1 is of a type commonly found in many different machines, vehicles and power transmission systems and the form depicted is intended to be illustrative and generic, it being understood that the present invention may be used with universal joints having constructions other than that shown in the drawings.

The yoke 4 is shown as having an elongated shank portion 10 which includes a central cavity in which the mechanism of the present invention is arranged. A plug member 11 is fitted into the open bottom end of the shank portion of yoke 4, as by a press fit or with appropriate fastening means, and is positioned to close off that end of the yoke. The plug 11 has a flat base portion 12 and an upstanding embossment 13 which extends over part of the base and includes a vertical wall 14 positioned between the extremities of the base 12. A transverse bore 15 extends through the embossment 13 and, as indicated best in FIGS. 2 and 3, is formed to have a first chamber 15a leading from the vertical wall 14 connected to a second chamber 15b, the second chamber being of smaller diameter than the first chamber for the reasons hereinafter set forth.

A plunger 16 extends through an aperture 17 formed in the shank 10 of the yoke 4, thence through the chamber 15 formed in the embossment 13, and through an aperture 18 formed in the opposite side of the shank. The plunger 16 is fitted into the apertures 17, 18 and chamber 15 so as to be slidable therein. The plunger includes an enlarged head 19 which can abut against the outer surface of the yoke in order to limit the sideways travel of the plunger. Other means for limiting the plunger travel can be used, however, and the spring 21 could also be adapted to perform this function. A weight 20 is securely attached to the end of the plunger 16 which projects through the aperture 18 of the yoke. The plunger 16 has a first portion 16a which fits into the first chamber 15a of the bore 15 and a second portion 16b of smaller diameter which fits into the second chamber 15b of the bore 15. A spring 21 is fitted about the second portion 16b of the plunger 16 and inserted within the first chamber 15a with its one end bearing against the shoulder 22 between chambers 15a and 15b, its other end bearing against the shoulder 23 between the first portion 16a and second portion 16b of the plunger. The spring 21 is to impose a biasing force against the shoulder 23 to urge the plunger into the position indicated in FIG. 2.

Spaced above the plug 11 is a follower disc 25 which fits within the central cavity of the shank 10 of the yoke 4. One end of a spring 26 bears against the upper surface of the follower disc 25 and the other end of the spring abuts the end of the shaft 2. The space inside the cavity between the follower disc 25 and the plug member 11 is filled with grease 27. This portion of the cavity, therefore, acts as the reservoir carrying the supply of grease which is to be pumped to the desired bearing points by the present mechanism. The spring 26 should have sufficient tension so that the follower disc 25 will move downwardly as the grease is used up during actuation of the mechanism in order to insure an adequate supply of grease to the first chamber 15a in the plug 11. As shown in FIG. 1, a grease fitting 28 extends through the yoke and communicates with the reservoir so that grease can be supplied thereto when necessary.

A vertical passage 30 leads from the first chamber 15a in the plug 11 and has a small initial portion 31 and a relatively larger second portion 32 connected by a surface 33. A hollow tube connector 34 is threaded into the second portion 32 of the passageway 30 and a small ball check valve 35 and spring 36 are fitted between the tube connector 34 and the surface 33. The ball check valve 35 seats against the surface 33 so as to act as a one way check valve controlling flow of grease through the passage 30, although it can be omitted in an appropriate installation.

Referring now to the spyder 6 in FIG. 2, a vertical passage 40 extends partly therethrough and connects with a cross passage 41 which is defined in opposed arms 7 of the spyder. A similar cross passage indicated by the circle 42 in the drawings is formed in the other pair of opposed arms 7 of the spyder.

Turning now to the right arm 7 of the spyder 6 as shown in FIG. 2, the outer end of the arm includes a small shaft portion 43, and a bearing 44 is fitted between the shaft portion 43 and the aperture in the end of the arm 4b. A passage 45 which intersects cross passage 41 is arranged to furnish grease to the surface between the shaft portion 43 and the bearing 44. Various constructions can be incorporated in the connection between the spyder and the yoke members, however, and another form is illustrated at the left hand arm 7 of the spyder 6. In this construction, a pin 46 is threaded or press fit into the aperture in the end of the arm 4a and a bearing 48 is fitted between the pin 46 and a hole 47 in the spyder arm. The pin 46 has a longitudinal passage 49 which mates with the cross passage 41 in the spyder and a transverse passage 50 is formed in the pin to lead grease to the surface between the bearing 48 and the pin. Suitable retainer rings not shown in the drawings would be included to hold the bearings 44 and 48 in place.

A tube connector 52 is threaded into the vertical passage 40 of the spyder and a flexible tube 53 is connected between the tube connectors 34 and 52 so that grease can flow from the passage 30 in the plug 11 through the tube and then into the passageways defined in the spyder. Each tube connector has a tapered bore which receives a tube end to hold it in place.

The action of the greasing mechanism described above is as follows: when the shafts 2 and 3 connected by the universal joint 1 are at rest, the weight 20 attached to the plunger 16 is in the position illustrated in FIG. 2 wherein it lies closely against the outer surface of the yoke 4. When, however, power is supplied to the shafts 2 and 3 and they begin to rotate in the direction shown by the arrow in FIG. 1, the weight 20 moves outwardly under the action of centrifugal force to the position shown in FIG. 3 and, during such movement, the enlarged first portion 16a of the plunger 16 enters and moves through the first chamber 15a of the bore 15 formed in the plug member. This develops pressure which delivers grease through the passage means connecting the chamber 15a to the bearing surfaces, first through the passage 30 in the plug member, and thence through the tube 53 and into the passage 40 of the spyder; from the passage 40, the grease flows through the cross passages 41 and 42 and thence through the passages 45 (or 49 and 50) to deliver the grease to the bearing surfaces which it is desired to lubricate. The pressure developed is sufficient to open the small check valve 35 to permit this flow of the grease. As grease from the chamber 15a is used up, the spring 26 urges the follower disc 25 downwards to force additional grease into the chamber from the reservoir supply. The pumping action stops when the weight 20 reaches the extended position shown in FIG. 3, and the weight remains in such position during rotation of the shafts; the head 19 of the plunger abuts the outer surface of the shank of the yoke to control the extended position of the weight 20. When the shafts stop rotating, the biasing action of the spring 21 fitted within the chamber 15a urges the plunger 16 to its at-rest position shown in FIG. 2. Thus, the plunger reciprocates between its position in FIG. 2 and that in FIG. 3. Thus, the action of the greasing mechanism now described is to provide grease to the selected bearing surfaces when the shafts commence rotating and a supply of grease will be pumped through the several passages in the spyder of the universal joint each time the shafts are started up.

The above described greasing action of the present mechanism occurs while the weight 20 is moving into its extended position and thereby drawing the plunger 16 through the chamber in the bore of the plug member. When the weight reaches its extended position, the action ceases and no further grease is supplied to the selected bearing surfaces. Thus, the mechanism of the present invention is designed to distribute a measured quantity of grease when it is actuated, instead of producing continuous flow of the grease which would be undesirable for the contemplated use of this invention. The bore 15, particularly the first chamber 15a, should be of an appropriate size to contain the quantity of grease which is desired to be delivered in any particular installation of the present invention. It is to be noted that the first portion 16 of the plunger does not entirely traverse the first chamber 15a and the position of the vertical passage 30 relative to the shoulder 23 of the plunger when the weight is moving to its extended position should be such that the passage 30 will be open a sufficient amount of time to permit passage therethrough of the desired quantity of grease.

As can be noted from the drawings, the present mechanism is rather evenly distributed with respect to the center line of the yoke in which it is contained so that it will not seriously add to imbalance of the universal joint. In order to further enhance weight balance, the side of the yoke 4 opposite from the weight 20, referring now particularly to FIG. 1, may have an enlarged area 55 of added material which is of such size as to weigh approximately the same as the weight 20 associated with the greasing mechanism and thereby enhance the balancing of the entire unit.

In one actual model of the present invention, the greasing mechanism was installed in a yoke of a universal joint and the plug member 11 had a diameter of approximately two inches. The weight 20 was about four ounces and the first chamber 15a and the plunger were appropriately sized so as to deliver .003 cubic inch of grease during each pumping action by the mechanism. It was computed that the greasing mechanism developed a pressure of about 300 p.s.i. when the shaft speed was about 1,000 r.p.m. It is to be understood, of course, that the mechanism can be designed to develop different pressures and deliver different quantities of grease to fit the selected installation.

There has thus been provided a greasing mechanism of particular applicability to rotatable universal joints which is capable of supplying a measured quantity of grease to the bearing surfaces of the universal joint even though the bearing surfaces and/or the grease fixtures which supply such surfaces rotate during normal use of the universal joint. Changes in one or more elements of the illustrated form of the greasing mechanism can be devised and it is to be understood that it is intended to cover all changes and modifications of the example of this invention herein chosen for the purpose of illustration which do not constitute a departure from the spirit and scope of this invention.

I claim:

1. In a universal joint connecting two rotatable shafts, said universal joint including (1) a first yoke attached to one of said shafts and a second yoke attached to the other shaft, each yoke including a hollow shank portion in which a shaft is received and fingers projecting from the shank portion, and (2) a connecting member joining the fingers of the first yoke to the fingers of the second yoke so that rotation of one shaft will cause rotation of the other, there being bearing surfaces between the fingers of each yoke and the connecting member and said connecting member including internal passages for supplying grease to said bearing surfaces, the combination with said universal joint of means for supplying a quantity of grease to the internal passages in the connecting member upon commencement of rotation of the shafts joined by the universal joint, said means comprising:
  (1) a plug member fitted in the shank of one of the yokes and including a transverse chamber;
  (2) a plunger mounted in said one yoke and adapted to be transversely slidable through the transverse chamber in the plug member;
  (3) a weight attached to one end of the plunger on the exterior of the yoke, said weight being adapted to cause the plunger to move in a first direction through the transverse chamber in the plug upon rotation of the shafts;
  (4) spring means in said transverse chamber and adapted to move the plunger in a second direction opposite to said first direction when the shafts stop rotating;
  (5) a reservoir above the plug member for holding a supply of grease in said one shank;
  (6) means for supplying grease contained in said reservoir to said transverse chamber;
  (7) follower means at the end of the reservoir opposite from the plug member and adapted to maintain a supply of grease in the transverse chamber of the plug member;
  (8) a passage defined in the plug member and communicating with said transverse chamber; and
  (9) tube means connecting said passage in the plug member with the internal passages in the connecting member of the universal joint;
  whereby movement of the plunger through the transverse chamber in the plug upon movement of said weight in said first direction will cause grease in the chamber to move through the passage in the plug, through said tube means and the internal passages in the connecting member, and thence to the bearing surfaces between the yokes and the connecting member of the universal joint.

2. In a universal joint connecting two rotatable shafts, said universal joint including (1) a first yoke attached to one of said shafts and a second yoke attached to the other shaft, each yoke including a hollow shank portion in which a shaft is received and fingers projecting from the shank portion, and (2) a connecting member joining the fingers of the first yoke to the fingers of the second yoke so that rotation of one shaft will cause rotation of the other, there being bearing surfaces between the fingers of each yoke and the connecting member and said connecting member including internal passages for supplying grease to said bearing surfaces, the combination with said universal joint of means for supplying a quantity of grease to the internal passages in the connecting member upon commencement of rotation of the shafts joined by the universal joint, said means including:
  (1) a plug member fitted in the shank of one of the yokes, said plug member including a base portion, an upstanding portion partly covering the base portion, and first and second transverse chambers in the upstanding portion, said chambers being in line with each other and the first chamber being larger than the second chamber;
  (2) a plunger mounted in said one yoke and adapted to be transversely slidable through the first and second chambers in the plug member, said plunger having a first portion which fits into the first chamber of the plug member and a second portion which fits into the second chamber of the plug member;
  (3) a weight attached to one end of the plunger on the exterior of the yoke, said weight being adapted to cause the plunger to move in a first direction through the chambers in the plug upon rotation of the shafts;

(4) spring means mounted in the first chamber of the plug member and adapted to move the plunger in a second direction opposite to said first direction when the shafts stop rotating;

(5) a reservoir above the plug member for holding a supply of grease in said one shank;

(6) means for supplying grease contained in said reservoir to said first transverse chamber;

(7) follower means at the end of the reservoir opposite from the plug member and adapted to maintain a supply of grease in said first chamber of the plug member;

(8) a passage defined in the plug member and communicating with said first chamber; and (9) tube means connecting said passage in the plug member with the internal passages in the connecting member of the universal joint;

whereby, upon movement of said weight in the first direction, the first portion of the plunger will enter the first chamber of the plug member and cause grease in said first chamber to move through the passage in the plug, through said tube means and the internal passages in the connecting member, and thence to the bearing surfaces between the yokes and the connecting member of the universal joint.

3. The combination as set forth in claim 2 further including means for limiting movement of said plunger in said first direction upon movement of the weight when the shafts start rotating.

4. In a universal joint connecting two rotatable shafts, said universal joint including (1) a first member attached to one of said shafts and a second member attached to the other shaft, each such member including a shank portion in which a shaft is received, and (2) a connecting member joining the first member to the second member so that rotation of one shaft will cause rotation of the other, there being bearing surfaces between connecting member and said first and second members and said connecting member including internal passages for supplying grease to said bearing surfaces, the combination with said universal joint of means for supplying a quantity of grease to the internal passages in the connecting member upon commencement of rotation of the shafts joined by the universal joint, said means comprising:

(1) a plug member fitted in one of the members on a shaft, said plug member including a transverse chamber;

(2) a plunger mounted for transverse reciprocating movement through the transverse chamber in the plug member;

(3) a weight attached to one end of the plunger on the exterior of said one member said weight being adapted to cause the plunger to move in a first direction through the transverse chamber in the plug member upon rotation of the shafts;

(4) means adapted to move the plunger in a second direction opposite to the first direction when the shafts stop rotating;

(5) an internal cavity in said one member forming a reservoir for holding a supply of grease;

(6) means for supplying grease contained in said reservoir to said transverse chamber;

(7) a passage defined in the plug member and communicating with said transverse chamber; and (8) tube means connecting the passage in the plug member with the internal passages in the connecting member of the universal joint;

whereby movement of the plunger through the transverse chamber in the plug member upon movement of said weight in the first direction will cause a quantity of grease to move from said chamber and through the passage in the plug member, through said tube means and the internal passages in the connecting member to supply grease to the bearing surfaces between the connecting member and the first and second members of the universal joint.

5. In a universal joint connecting two rotatable shafts, said universal joint including (1) a first member attached to one of said shafts and a second member attached to the other shaft, each such member including a shank portion to which a shaft is received, and (2) a connecting member joining the first member to the second member so that rotation of one shaft will cause rotation of the other, there being bearing surfaces between connecting member and said first and second members and said connecting member including internal passages for supplying grease to said bearing surfaces, the combination with said universal joint of means for supplying a quantity of grease to the internal passages in the connecting member upon commencement of rotation of the shafts joined by the universal joint, said means comprising:

(1) a plug member fitted in one of said members and having a transverse chamber defined therein;

(2) a plunger mounted in said one member and having an enlarged portion which fits in said transverse chamber in the plug member, the plunger being reciprocable between a first position and a second position;

(3) a reservoir in said one member for holding a supply of grease in said one shank;

(4) means for supplying grease contained in said reservoir to said transverse chamber in the plug member;

(5) passage means connecting the transverse chamber in the plug member with the internal passages in the connecting member of the universal joint; and (6) a weight attached to one end of the plunger and adapted to cause the plunger to move to its second position upon rotation of the shafts, in which position the enlarged portion of the plunger moves through at least part of the transverse chamber in the plug member and causes at least part of the grease contained therein to move through the aforesaid passage means and supply grease to the bearing surfaces between the connecting member and the first and second members of the universal joint.

References Cited

UNITED STATES PATENTS

| 1,443,969 | 2/1923 | Thiemer | 64—17 |
| 3,006,168 | 10/1961 | Kayser | 184—6 X |

FOREIGN PATENTS 674,500   4/1939   Germany.

LAVERNE D. GEIGER, *Primary Examiner.*

E. J. EARLS, *Assistant Examiner.*